United States Patent [19]
Ricci et al.

[11] Patent Number: 5,223,793
[45] Date of Patent: Jun. 29, 1993

[54] APPARATUS FOR CONTROLLED ROTATION OF A SPHERE OR BALL FOR INSPECTING OR MARKING THE SURFACE WITH A PREDETERMINED PATTERN

[75] Inventors: Roy J. Ricci, Annapolis, Md.; Gordon C. Oehler, Reston, Va.; Donald M. Caldwell, Bethesda, Md.

[73] Assignee: Intex Inc., Annapolis, Md.

[21] Appl. No.: 693,142

[22] Filed: Apr. 29, 1991

[51] Int. Cl.$^5$ .................. G01N 27/90; G01M 13/04; F16H 15/56
[52] U.S. Cl. .................. 324/262; 324/226; 324/233; 324/238; 324/261; 73/660
[58] Field of Search ............ 324/202, 207.11–207.26, 324/226, 228, 233, 234, 236–243, 262; 73/593, 640, 660; 74/198

[56] References Cited

U.S. PATENT DOCUMENTS

| 3,267,755 | 8/1966 | Isely | 74/198 |
|---|---|---|---|
| 3,398,592 | 8/1968 | Brany | 74/198 |
| 3,486,616 | 12/1969 | Brany et al. | 73/593 X |
| 3,718,855 | 2/1973 | Rogel et al. | 324/202 |
| 4,155,455 | 5/1979 | Spierer et al. | 324/232 X |
| 4,280,094 | 7/1981 | Karlsson | 324/202 |
| 4,281,548 | 8/1981 | Köber | 73/593 |
| 4,286,467 | 9/1981 | Köber | 73/593 X |
| 4,387,596 | 6/1983 | Fenkner et al. | 73/593 |
| 4,430,614 | 2/1984 | Gereg | 324/238 |
| 4,495,587 | 1/1985 | Plante et al. | 324/226 X |
| 4,551,677 | 11/1985 | Bankston | 324/226 |
| 4,649,344 | 3/1987 | Moll et al. | 324/202 X |
| 4,727,322 | 2/1988 | Lonchampt et al. | 324/207.15 X |
| 4,732,494 | 3/1988 | Guers et al. | 324/207.22 X |
| 4,864,239 | 9/1989 | Casarcia et al. | 324/226 X |
| 5,008,623 | 4/1991 | Dolfsma et al. | 324/238 X |

Primary Examiner—Gerard R. Strecker
Assistant Examiner—Warren S. Edmonds

[57] ABSTRACT

An apparatus for rotating a spherical object, which includes suspension means for supporting a spherical object in a fixed position relative to its center. The suspension means holds the sphere by simultaneously contacting its surface with contacting elements at at least four points spatially independent of each other on the surface. Each of the contact elements is of regular shapes, such as, spheres, cylinders, cones or other shapes having symmetry about an axis of rotation. At least one of the contact elements is rotationally driven by a rotating drive means. The rotating drive means is rotated at a fixed or time-varying speed to impart controlled movement to the sphere about an axis through its center. The speeds or time-varying functions thereof cause the resultant controlled rotational motion of the sphere by manipulating an axis of rotation through its center.

11 Claims, 10 Drawing Sheets

APPARATUS FOR CONTROLLED ROTATION OF A SPHERE OR BALL FOR INSPECTING OR MARKING THE SURFACE WITH A PREDETERMINED PATTERN

BACKGROUND OF THE INVENTION

1. Field Of The Invention

The invention relates to a method and apparatus capable of rotating a spherical object on any axis through its center with the axis varying as a function of time such as to cause the object's surface to move past a selected point above the surface in a path.

2. Prior Art

In the manufacture of spherical components, such as, bearing balls used in the automotive, aerospace and aircraft industries, it is often necessary to inspect the condition and appearance of the ball for defects which would be detrimental to their performance. Electromagnetic, ultrasonic, optical, x-ray and other instrumental techniques are used for such inspection. It is generally desirable to inspect the entire surface using small sensors or probes with sensing areas very much smaller than the total ball surface. Inspection of the complete surface requires manipulating the sensor around a stationary ball or manipulating the ball surface past a stationary sensor or probe or a combination of such motions. In any case, controlled motion is required in order to realize complete inspection coverage of the entire surface.

Similarly, in other manufacturing operations, controlled motion of a spherical surface for treatment, marking, or applications of other materials in pre-determined patterns is required. For such applications also, either an applicator or spherical object or both are required to be manipulated in order to complete the process.

In one prior method (U.S. Pat. No. 3,398,592) controlled movement of balls is accomplished by suspending the ball at four points between a combination of conical and cylindrical elements with one of the elements being a driven rotating member. One or two the others are rollers of eccentric conical sections or irregular cylindrical sections axially fixed connected by a cylindrical coaxial portion of a shaft which is journaled in bearings (see FIGS. 11 to 13 and 16A to 16h) whose dimension or shape are such as to cause the driven ball to rotate on a moving axis in order to provide a complete scan in front of a fixed reference point. A major disadvantage of this method is that sets of different rotating elements of complex geometry are required for each ball size to be tested thereby requiring maintaining a large inventory of elements and changing of the elements for each ball to be manipulated or maintaining an inventory of complete machanisms for each ball size. Another disadvantage is that only one scan pattern may be realized with a given set of elements thereby precluding the capability to provide various scan patterns with only one set of elements.

The prior art section of U.S. Pat. No. 3,398,592 states:

"In known methods for rotating balls, the ball is rolled between two conical driving elements which, in addition to a basic rotary movement about a common axis, also move relative to each other."

"When the known method is applied to ball of relatively large diameter requiring a great number of meridians, it is impossible even in precisely built devices adequately to inspect areas at the poles of the meridian pattern."

In another prior technique (U.S. Pat. No. 4,551,677), specifically for the eddy-current testing of balls, the method uses an inverted cone-shaped cup placed over the top of a ball which in turn is placed on a flat, high-friction surface. Friction between the ball and the cone-shaped cup is reduced by creating a surface of pressurized air between the ball and the cup via an air injection nozzle on the cup. With the ball so clamped between the cup and the flat surface, the cup is made to move over the surface in a predetermined manner such as to cause each point of the ball surface to move and pass by an eddy-current probe mounted on the cone-shaped cup. The preferred embodiment is to move the cup in an X-Y raster scan pattern over the front surface with movements between each X and Y direction traversal fixed in order to affect a global scan pattern with equally spaced meridian lines. Two disadvantages of this method are (a) requirement for complex mechanics for high-speed inspection of balls and (b) limited ball-size range for a given set of cup dimensions.

In still another method used specifically for inspection of bearing balls (U.S. Pat. No. 4,430,614), the ball is held by vacuum on the end of a hollow cylinder which rotates in one direction. A probe is placed above the ball at a point perpendicular to the axis of the cylinder such that as the cylinder (and ball) rotates, the trajectory of the probe is a great circle. The probe is then made to move in an arc in the plane of the holding cylinder such that the probe trajectory is a series of circles of diminishing diameter thereby effecting a helical scan pattern over a portion of the ball surface. Using a second hollow cylinder under vacuum, the ball is removed from the first cylinder, the second cylinder rotates 90°, the ball then replaced on the first cylinder and the process repeated to affect the helical scan over the previously uncovered portion of the ball. Two disadvantages of this method are (a) double manipulation of each ball requiring longer time to complete the scan and more complex apparatus and (b) the velocity of the inspection point on the surface with respect to the probe decreases as the probe travels an arc and goes to near zero at the pole of the scan.

In a non-confidential telephone communication by one of the inventors with an employee of NASA, the NASA employee stated that in research done prior to publication of NASA Tech Brief, Viol. 8, No. 3, MFS-25833 and filing for U.S. Pat. No. 4,551,677, attempts were made to scan the surfaces of bearing balls utilizing two fixed-speed motors to rotate the ball on two perpendicular axes but it was found that this method would not yield continuous rotation of the axis of rotation. Further attempts were made using three independently driven fixed-speed motors but it proved too difficult to precisely control the motor speeds to effect an accurate scan.

For ultrasonic inspection of balls, other methods are known (U.S. Pat. Nos. 4,281,548 and 4,387,596) in which a ball is held in a spherical cavity with the entire assembly submerged in a liquid coupling medium suitable for ultrasonic inspection. One or two liquid jets introduced into the side walls of the spherical cavity are directed such as to cause the ball to rotate precessionally or multi-axially in the presence of ultrasonic transducers directed at the ball. The requirements to submerge the entire apparatus in a liquid medium limits the application of types of objects to be inspected, slows down the inspection cycle and further presents a possible contamination problem when the item to be inspected cannot be cleaned before and after immersion in the liquid medium.

Other methods have been attempted by applicants in which two or more rotating elements were used to manipulate a ball held in a stationary position with respect to the axis of rotation of the rotating members. In these cases, the rotating elements were driven at fixed differential speeds. It was ultimately shown that under such conditions, the entire surface of the sphere could not be moved past a fixed point in a controlled manner.

BROAD DESCRIPTION OF THE INVENTION

An object of the invention is to provide apparatuses and methods which allow rotating a spherical object on any axis through its center with the axis varying as a function of time such as to cause the object's surface to move past a selected point above the surface in a path (predetermined or controlled or otherwise). This allows positioning of any sensor (e.g.; eddy-current, optical, ultrasonic, gauging, etc.) for inspection of the surface or applicator (paint marking, cutters, fiber applicator, etc.) such as to perform the desired sensing or applicating over portions or all of the objects surface in a predetermined pattern or patterns.

Applications of the invention include, but are not limited to:

(a) Performing complete eddy-current, ultrasonic or dielectric inspection for detection of flaws or other surface or sub-surface anomalies on metallic and non-metallic spherical objects such as balls used in ball bearings or other mechanical apparatus.

(b) Performing optical, visual or X-ray inspection over the entire surface of the spherical object utilizing light sources and detectors for sensing variations in the surface finish (color, scratches, etc.) or utilizing appropriate lenses focused on a small area of the surface of the object which is manipulated past the viewing point.

(c) Application of markings (paints, dyes, inks, etc.) in pre-determined patterns over any portion of the surface of a spherical object.

(d) Application of continuous fibers in a pre-determined pattern over a spherical surface for forming a fiber-reinforced vessel or otherwise wrapping the object with fibers in a pre-determined pattern.

(e) Cutting, machining or engraving patterns over all or a portion of the surface of spherical object.

The invention is particularly useful for methods and apparatuses for manipulating the spherical object with the sensor, probe, applicator or other treatment device in a fixed position such as to effect complete coverage of the spherical surface in the desired pattern or patterns in a highly repeatable manner.

This invention involves suspending and holding a spherical object at four or more contact points under the condition that if there are m contact points (m≧4), a plane can be found which passes through the center of the sphere such that at least one but not more than (m−1) points are to one side of that plane and at least one point is on the opposite side of that plane and those points positioned such as to assure stable holding of the sphere in suspension (including during rotation). The sphere is held at each contact point by contact elements all of which are of regular shapes; conical, cylindrical, spherical or combination thereof which has symmetry about at least one axis of rotation in order to provide smooth, controlled motion of the sphere.

The invention involves an apparatus for rotating a spherical object, which includes suspension means for supporting a spherical object in a fixed position relative to its center. The suspension means holds the sphere by simultaneously contacting its surface with contacting elements at least four points spatially independent of each other on the surface. Each of the contact elements is of regular shapes, such as, spheres, cylinders, cones or other shapes having symmetry about an axis of rotation. At least one of the contact elements is rotationally driven by a rotating drive means. The rotating drive means is rotated at a fixed or time-varying speed to impart controlled movement to the sphere about an axis through its center. The speeds or time-varying functions thereof cause the resultant controlled rotational motion of the sphere by manipulating an axis of rotation through its center.

The method of this invention overcomes the shortcomings of the prior methods through use of computer numerical control to rotate a combination of conical, cylindrical or spherical elements in a multi-element support assembly in which the driven elements are rotated at variable speeds. The variable speeds are a cyclical function of time, the specific function of which is established for the ball size and scan pattern desired and implemented/controlled with an appropriately programmed microcomputer.

The method of this invention includes suspending a spherical object in a fixed position relative to its center by contacting its surface with contacting elements at four or more points on the surface. Although four suspension points are generally sufficient to securely hold a sphere suspended in fixed position, there will be some applications in which five, six or more points of contact are required to enhance position stability or attach additional sensing or applicating devices.

DETAILED DESCRIPTION OF THE INVENTION

Figure 1:
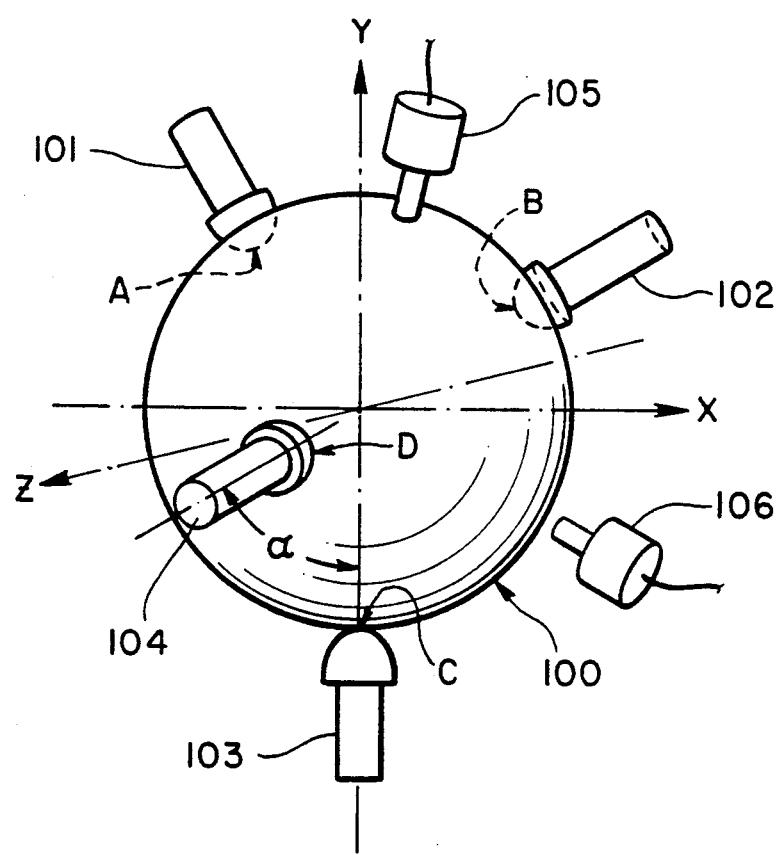
FIG. 1 shows the general arrangement for four-point suspension of a spherical object, with placement of a sensing and/or applicating device and definition of X-Y-Z coordinates used to describe the motion of the sphere in various embodiments of the invention.

FIG. 1 shows one general arrangement for suspending a spherical object 100 at four contact points A, B, C and D by four contact elements 101, 102, 103 and 104 such that the four contact points satisfy the condition stated above. The contact elements are shown as general shapes for discussion of the principles involved in the invention and in actual embodiments of the invention they are regular shapes with axial symmetry as stated earlier. For convenience of description, an X-Y-Z cartesian coordinate system is specified centered on the spherical object 100.

Contact points A and B are shown off the X-Y plane in the −Z direction, contact point C is on the Y axis and contact point D is off the X-Y plane at any point in the +Z direction, not necessarily on the Z axis. Alternatively, the contact points A and B can be in the X-Y plane and contact point C off the X-Y plane at any point in the −Z direction not necessarily on the Y axis. Another alternative is that all three contact points A, B and C are off the X-Y plane at any points in the −Z direction so long as contact point D is off the X-Y plane in the +Z direction. All those arrangements or any others which satisfy the previously stated condition on placement of the m contact points will result in holding the sphere securely in position.

In those cases where more than four contact points are used either to enhance the stability of holding (for an extremely heavy sphere, for example) or to facilitate a specific motion control, the additional contact points can be positioned at any X-Y-Z coordinates.

A plurality of sensing or applying devices, two shown as 105 and 106, are positioned on or above the surface of the spherical object at any convenient points (free of interference with the four contact points A, B, C and D) required for the specific function (testing, inspecting, marking, etc.) to be implemented. For example, in eddy-current inspection, the eddy-current sensor would be best placed anywhere in the Y-Z plane such as shown by 105. For optical inspection, a light source 105 and detector 106 would be positioned anywhere around the sphere such as the reflect a spot of light off the object surface from the source to the detector at the desired angle.

Any one or all of the contacting points can be either rotationally driven or free-wheeling, dependently or independently with speed/motion controls to accomplish the desired pattern of motion of the sphere. In some applications only one will be driven with the others free-wheeling. In some applications two or more will be driven with all others free-wheeling.

With the arrangement as described above, various scanning (sphere manipulation) patterns can be established. In the most general cases, it is desirable to rotate the sphere such as to have 100 percent of its surface pass in front of the sensing or application device in a precisely controlled pattern or to have small sections of its surface manipulated in front of those devices in a precisely controlled pattern. This invention includes various specific embodiments in which the contact elements 101, 102, 103 and 104 and specific motion control of those are such as to produce a controlled scan over the entire surface of the sphere.

Figure 2:
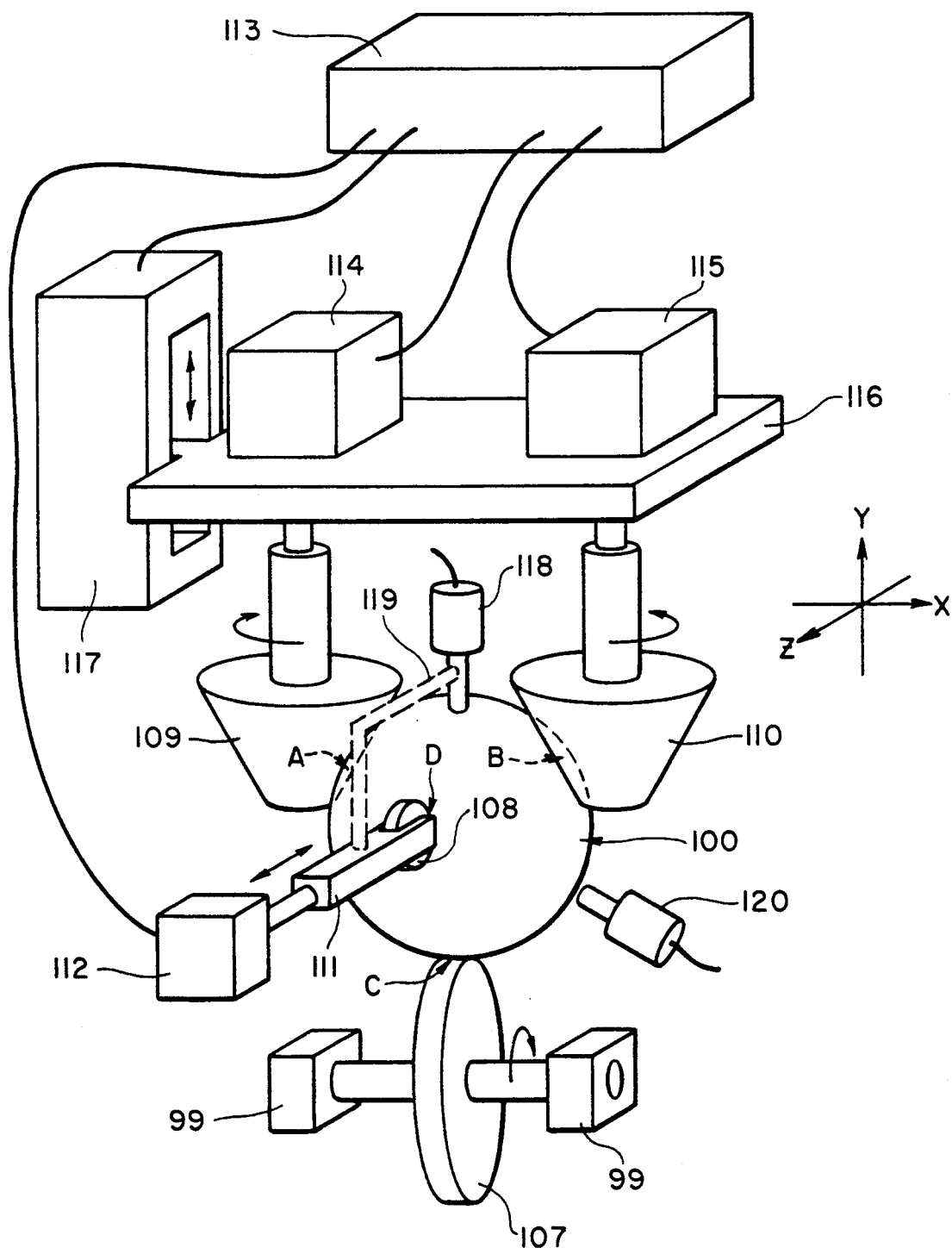
FIG. 2 is an isometric view showing the arrangement of suspension and scan control elements in a preferred embodiment of the invention.

FIG. 2 shows a preferred embodiment of the invention for manipulating a sphere 100 such that its entire surface passes completely in front of a small sensing element such as to produce either a global- or orbital-type scan pattern over the surface. In this case, the contact element at the contact point C is a free-wheeling cylindrical disk 107 supported in bearings 99 contacting the sphere on the Y axis. The contact element at the contact point D is also a free-wheeling cylindrical disk 108 in the Y-Z plane positioned at any angle with respect to point D as described in connection with FIG. 1. The elements 107 and 108, alternatively can be free-wheeling spheres supported in hemi-spherical cups, i.e., cup bearings or air bearings.

The contact elements at the contact points A and B, 109 and 110, are both conical and positioned to contact the sphere at two points on a line which is above and parallel to the X axis and in a plane parallel to the X-Y plane and displaced slightly in the −Z direction. As such, the sphere is securely suspended in the mechanism.

The cone-angle for the conical elements 109 and 110 can be any angle between 0° and 90°. At the 0° and 90° angles, the cones degenerate into cylinders—a case which offers advantages in some applications. It is not necessary that the cone-angles for the two conical elements be equal to each other although they are specified as equal in this preferred embodiment. An important advantage of using conical elements is that they serve the additional function of exerting a downward force on the sphere 100 against the rotating contact element 107. Also by displacing the axis of the two conical elements 109 and 110 slightly in the −Z direction, an additional force is exerted on the sphere 100 in the +Z direction against the contact element 108. Those two factors (cone shape and displacement of axis) assure firm clamping of the sphere 100 in the apparatus.

The element 107 is fixed in position and supported in low-friction bearings. The element 108 is positioned in the Y-Z plane and elements 109 and 110 in the X-Y plane to accommodate the specific diameter of the spherical object. The element 108 is mounted on an arm assembly 111 the position of which in the Y-Z plane is controlled by motion control mechanism 112 which includes an appropriate combination of conventional motors, linear actuators, gears and bearings to precisely position 108. The motion control mechanism 112 is controlled by the microcomputer 113 programmed to position 108 to the desired point for a given sphere diameter.

The conical elements 109 and 110 are mounted with their centers on a line parallel to the X-Y plane with equal elevation of both along the Y axis. Each of these elements is driven by speed-controlled motors with appropriate gear assemblies, 114 and 115. Each is independently speed-controlled by the microcomputer 113. As shown later, the desired pattern of manipulation of the spherical object is achieved by independently varying the speed as a function of time of each of the two conical elements 109 and 110.

The two conical elements 109 and 110 are mounted on a rigid assembly 116 the position of which is controlled along the Y direction by a motion control mechanism 117 such as described for the control mechanism 112. The motion control mechanism is controlled by the microcomputer 113 programmed to position 109 and 110 to the desired elevation in the Y direction for a given sphere diameter.

A sensing or applicating device 118 is positioned at a point contacting or immediately above a point on the sphere 100. In this embodiment the device 118 is fixed in position with respect to the contact element 108 and mechanically linked thereto by any suitable linkage 119. The linkage can be either fixed or geared to the assembly 111 supporting the element 108 such as to maintain the required spatial relationship between the device 118 and contact point D. It is not necessary for the device 118 to be in the same plane as contact point D. Its position is chosen for the specific testing, applicating or inspecting application for which the invention is used.

In some applications, it will be desirable to position the device 118 at points independently controllable with respect to any of the contact points A, B, C or D. In that case, device 118 would be mounted on an assembly with microcomputer controlled position mechanism similar to that used to control the positions of the assemblies 111 and 116. In still other applications as mentioned in connection with FIG. 1, it will be desirable to use two devices such as a light, x-ray or ultrasonic source and a matching detector to receive reflected, scattered or transmitted signals from the source. In those cases, the second device will be located at either a fixed or computer controlled position at any desired point free of interference with any of the other elements of the system. A second device 120 is shown in FIG. 2 as an example of a position for that device when two different different devices are required.

In operation, the spherical object to be manipulated or tested is placed in the support system by moving either the assembly 116 upwards or moving assembly 111 outward along the $+Z$ axis or moving both accordingly. The spherical object is then placed in position resting on the element 107 which contacts the sphere 100 at contact point C. The sphere 100 may be placed in that position either manually or mechanically fed into position from a feed tube or hopper located behind the two conical elements 109 and 110 along the $-Z$ direction. In the latter case, prior to feeding a sphere, the assemblies 111 and 116 are positioned such the contact points A, B and D provide an opening slightly larger than the sphere diameter such that the sphere will freely roll into position and still be held approximately in place for final positioning of the elements 108, 109 and 110. In practice it has been found that raising the assembly 116 by an amount equal to a small fraction of the sphere diameter above the actual contact points A and B is sufficient for this purpose.

When the sphere 100 is in that first position (placed either manually or mechanically fed) the assemblies 111, and 116 are moved to their final position to contact the sphere 100 at points A, B and D by action of the computer controlled position control mechanisms 112 and 117. Once in that position, the two conical elements 109 and 110 are driven by speed-controlled motors 114 and 115 to produce the desired motion or scan pattern of the surface of the sphere 100. A variety of scan patterns can be realized by appropriate selection of the speed versus time functions for the two drives 114 and 115.

In many applications it is desirable to manipulate the sphere 100 so that a sensing device positioned at one point as shown for 118 will scan the entire sphere surface along great circle meridians in a global pattern with the spacing of the meridians at the equator being fixed and adjustable. As an example of the means of manipulating a sphere in a predetermined pattern as is the object of this invention, that case is described in detail below.

Figure 3A:
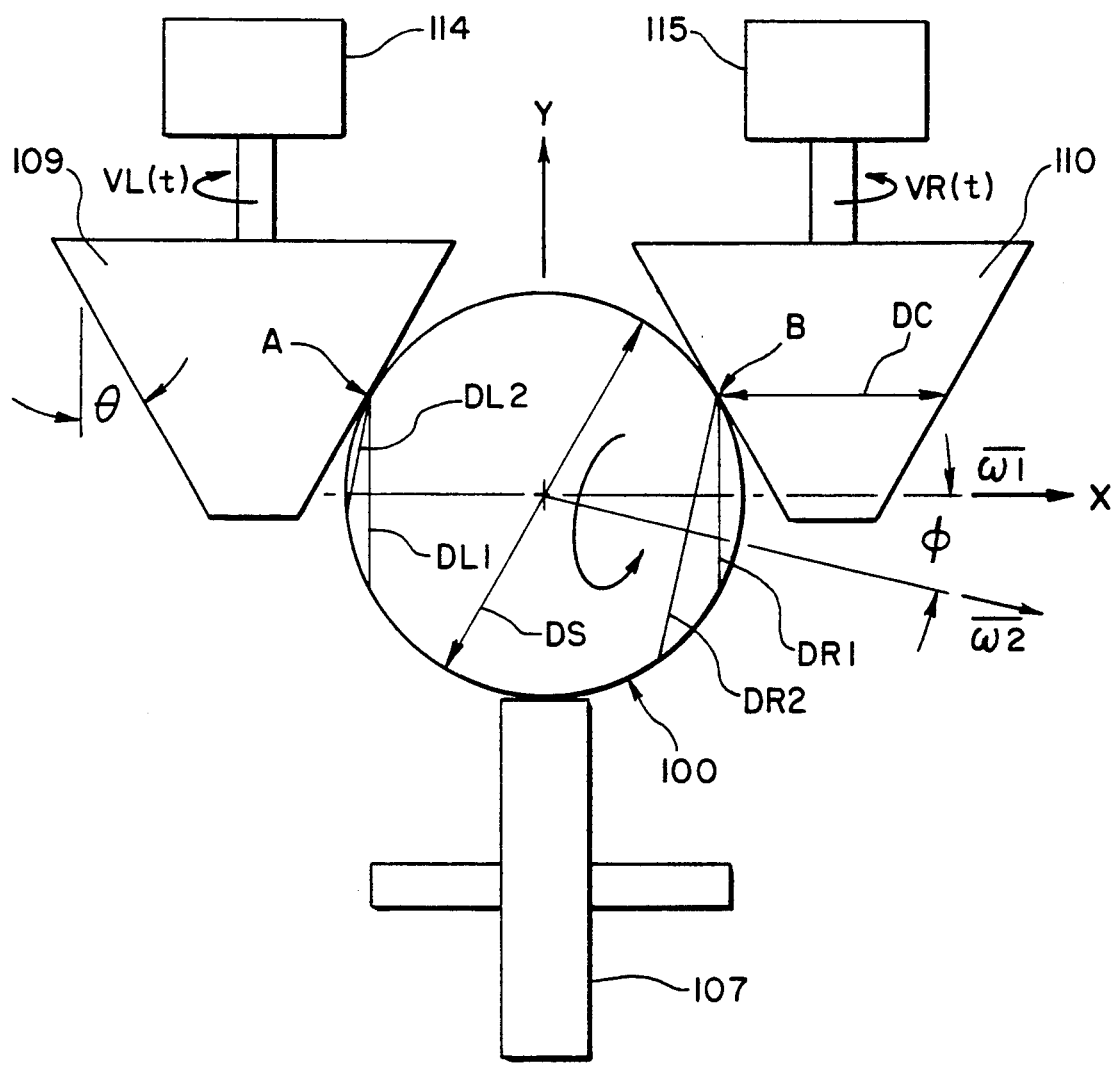
FIGS. 3A, 3B, and 3C are illustrations for describing the rotating and tilting motions imparted to the spherical object.

FIG. 3A is a sectional schematic view in a plane through the centers of the conical elements 109 and 110 and parallel to the X-Y plane. The controlled motion is achieved solely by action of the varying speeds of 109 and 110 so that only those components are necessary to show in order to describe the motion control process.

Figure 3C:
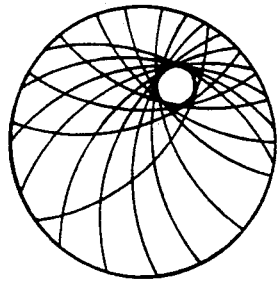

In FIG. 3A the speed as a function of time of the conical element 110 on the right is designated VR(t), that corresponding to 109 on the left as VL(t). W1 and W2 designate vector axis of the sphere rotation. DS is the diameter of the sphere 100. DR1, DR2, DL1 and DL2 designate the right and left side diametric contact point trajectories of the contact points A and B for the two different rotation vectors W1 and W2. The cone angle of the conical elements is designated as $\Theta$ and the diameter of the cones at the contact point with the sphere 100 is designated as DC. The angular difference between the two rotation vectors W1 and W2 is designated as $\phi$. The distance between meridians of the scan lines at the equator is $\delta$, as shown in FIG. 3C.

When VR(t) and VL(t) are equal in opposite directions and both of constant speed they will drive the sphere 100 and cause it to rotate about the X axis with rotation vector W1. As the two speeds are equal, the diameters DR1 and DL1 must be equal as each trajectory must be identical for each complete revolution of the two conical elements 109 and 110. As long as the two speeds VR and VL are equal and constant the sphere will continue to spin about the X axis at angular velocity W1. The following equalities must hold:

$$Vr) \cdot (DC) = (W1) \cdot (DR1)$$

$$(2) \ (VL) \cdot (DC) = (W1) \cdot (DL1)$$

Dividing (1) by (2) gives:

$$\frac{VR}{VL} = \frac{DR1}{DL1} \tag{3}$$

Therefore, with VR=VL; DR1=DL1. If the speed of the right side element 110 is increased to a new constant valve (VR+$\Delta$) and the left side element 109 decreased the same amount to (VR−$\Delta$) we will have;

$$\frac{VR + \Delta}{VR - \Delta} = \frac{DR2}{DL2} \tag{4}$$

where DR2 and DL2 are the new sphere contact diameters necessary to satisfy the conditions of (1) and (2). The axis of rotation of the sphere must tilt down under the new conditions by an angle $\phi$. For the given conditions, it can be shown that the contact diameters must satisfy the two conditions;

$$DR2 = (DS) \cdot Sin \ (\Theta - \phi) \tag{5}$$

$$DL2 = (DS) \cdot Sin \ (\Theta - \phi) \tag{6}$$

Substitution of (5) and (6) into (4) and reducing the resulting expression by invoking trigonometric identities will ultimately yield:

$$\Theta = (Cot \ \Theta) \ (Tan \ \phi) \cdot (VR) \tag{7}$$

or $\Delta = (Cot \ \Theta) \ (Tan \ \phi) \cdot (VL)$

Since VR=VL (the constant speeds) let VR=Vl=VC, the constant speed of the conical elements which yield the rotation vector $\overline{W1}$, and express the speed differential required for a given tilt angle $\phi$ as;

$$\Delta = (Cot\ \Theta) \cdot (VC) \cdot (Tan\ \phi) \qquad (8)$$

For a desired spacing $\delta$ between the meridians at the equator, we have from spherical trigonometry that;

$$\phi = \frac{2\delta}{DS} \qquad (9)$$

or finally, to express the required speed differential for a desired scan pattern with line separation of $\delta$ we have;

$$\Delta = (Cot\ \Theta) \cdot (VC) \cdot \frac{2\delta}{DS} \qquad (10)$$

or $$\Delta = (Cot\ \Theta) \cdot \left(\frac{2\delta}{DS}\right) \cdot (VC)$$

From this it is seen that to tilt a sphere of diameter DS for a spacing $\delta$ using conical elements with cone angle $\Theta$, increase the cone speed on one side and decrease it on the other, both by an equal factor which is a fraction of any given base speed VC i.e., for the example shown set the two speeds to:

$$VR = (1 + \Delta)\ VC \qquad (11)$$

$$VL = (1 - \Delta)\ VC \qquad (12)$$

Consider a practical example of rotating and manipulating a 1" diameter sphere using conical elements with a 30° cone angle and rotating the two cones at fixed speeds of 30 rpm. To determine the speed differential required to tilt the axis of rotation such that the new resulting meridian will be spaced 0.1" (at the equator) from that generated with both speeds fixed, we have:

$$\Delta = (Cot\ 30°) \cdot \left(\frac{2(0.1)}{1.0}\right) \cdot VC$$

$$= \sqrt{3}\ (0.2)VC = 0.346\ VC$$

then letting $$VR = (1 + 0.346)\ (30) = 40.4\ \text{rpm}$$

$$VL = (1 - 0.346)\ (30) = 19.6\ \text{rpm}$$

will yield the desired 0.1" separation to within reasonable and useful accuracy. Implementing the required speed control is a simple, practical matter, utilizing currently available low-cost, high-speed microcomputers and motion control elements.

In order to complete a full global scan over the entire surface with equally spaced meridians, it is only necessary to alternately drive the cones at fixed speeds and at the calculated differential speeds on a periodic cyclic basis. One practical method is to drive both cones at equal speeds for a time interval corresponding to one or more full half-revolutions of the sphere. At the end of any one complete half-revolution increase the speed of one cone and decrease that of the other to the two new differential speeds and maintain those speeds over a time interval corresponding to one or more one-half revolutions at the end of which time return both cones to their original speed and repeat the process. This repeated action will result in tilting the axis of rotation each cycle to produce the global scan illustrated in FIG. 3(b).

Figure 3B:
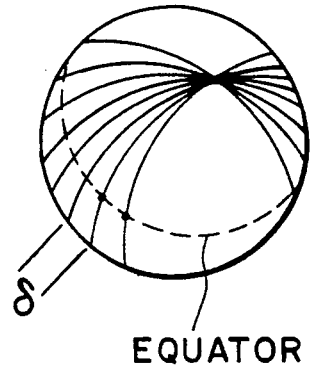

Under less than ideal conditions, the perfect global scan pattern of FIG. 3(b) will not be realized due to factors such as contaminants on the sphere surface causing drag or slippage, errors or unwanted momentary shifts in cone speeds, errors in the vertical position of the cones, etc. In such instances, the end result will be an complete scan leaving small voids at the poles of the global pattern where all the meridians should intersect. For inspection or testing purposes, such errors would result in those areas left uninspected or untested. Gross errors would result in a pattern shown exaggerated in FIG. 3c.

Where it is likely that such errors will occur, it is possible to correct for those and achieve 100 percent or more scan coverage of the surface of the sphere. This is accomplished by first completing the number of revolutions with cyclic speed variations required to scan the entire surface. At the moment of completion, leave both cones rotating at equal speeds for one-quarter of a revolution then start the process all over again. This will result in shifting the original poles to the original equator. When the process is restarted, the voids near the original poles will now be at the equator of the new scan. The process is continued for the number of revolutions required to cover completely the maximum anticipated void space.

From the explanation above and knowledge of rotational motion, it can be seen that various scan patterns over a spherical object can be realized by; (a) introducing time-varying speed at any two or more of the four contact points A, B, C and D, and/or (b) utilizing other than conical shapes for the contacting and/or drive elements. Specific various embodiments of these principles which will also produce controlled motion of a spherical object are now presented.

Figure 4:
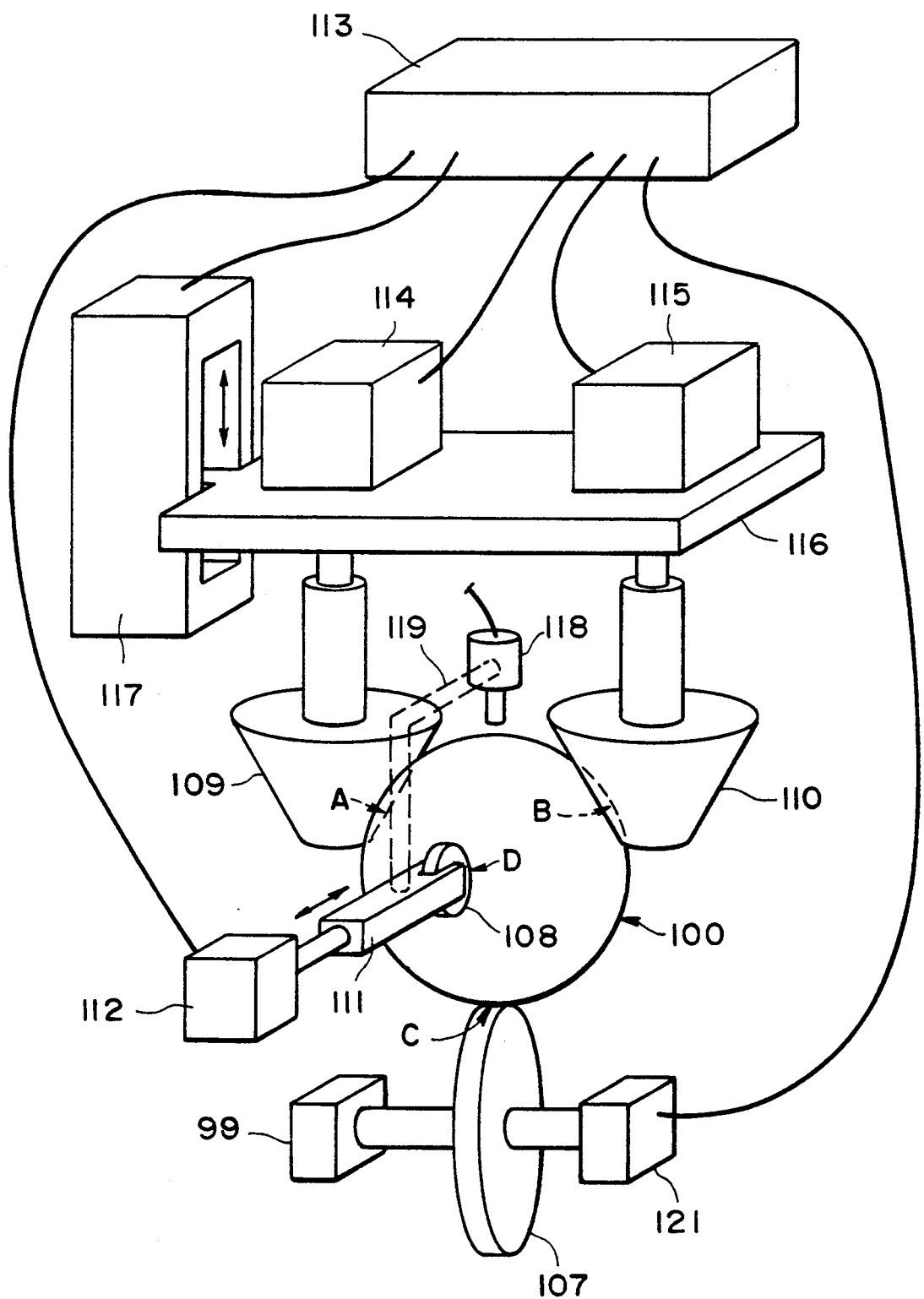
FIG. 4 an isometric view along the format of FIG. 2 of another embodiment of the invention.

FIG. 4 illustrates a second embodiment of this invention which incorporates the same set of contact elements as in the first embodiment but in which the contact element at contact point C is also rotationally driven by speed-controlled motor and gear assembly 121 which is either identical or similar in function to 114 and 115. In FIG. 4, all components except for 121 are the same as illustrated in FIG. 2 and only those components from FIG. 2 which are sufficient to describe this second embodiment are shown.

In this case, the sphere is driven to rotate about the X axis by the contact element 107 with drive 121. The two conical elements 109 and 110 are driven in an on-off manner rather than continuously driven as in the first embodiment. The conical elements are alternately free-wheeling and then driven periodically at differential speeds. In this embodiment the sphere rotation about the X axis is achieved by driving element 107 with the two conical elements 109 and 110 are free-wheeling. Periodically and for a predetermined time-interval, the two conical elements are driven at differential speeds to tilt the axis of rotation exactly as done in the first embodiment.

It is clear that with the two conical elements 109 and 110 free-wheeling and the sphere driven at fixed angular velocity by the disk 107, the conical elements will rotate at exactly the same speed as they would have been driven at in the first embodiment in order to get the same angular velocity as in this embodiment. Accordingly, the tilting of the axis of rotation in the embodiment will be as described for the first case.

This embodiment requires three speed-controlled drives instead of two and is therefore more complex and costly to implement than is the first. This embodiment offers the advantage of greater degree of freedom in generating various scan patterns in that three, rather than two, drives are available for controlling motion.

Figure 5:
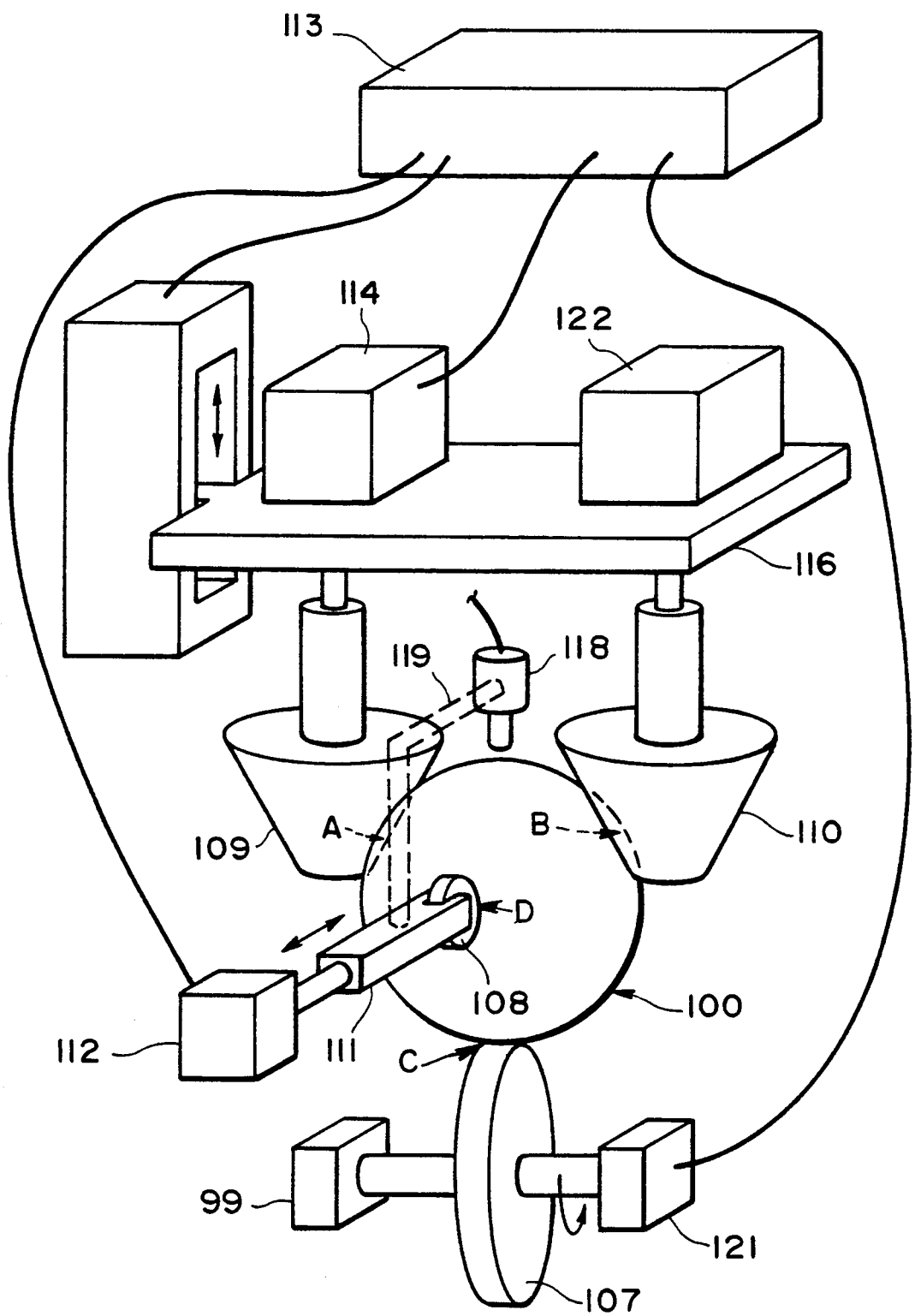
FIG. 5 an isometric view along the format of FIG. 2 of another embodiment of the invention.

A third embodiment of this invention shown in FIG. 5 is a simplified version of the second embodiment in which only one of the conical elements 109 is driven and the other 110 is free-wheeling in a bearing 122. The principle of operation is identical to the first two embodiments. In this case, the free-wheeling conical element 110 is forced to rotate at the same speed it would have bee driven at in the second embodiment for a given set of speeds for the drive element 107 and conical element 109. When the speed of the conical element 109 is increased above its free-wheel speed forced by the cylindrical element 107, the contact diameter at contact point A must increase resulting in the axis of rotation to tilt in the same manner as in the first embodiment provided there is sufficient friction between the sphere surface and the conical element 110 at the contact point B. For those applications in which provision for friction is made by proper choice of materials, this embodiment offers the advantage over the second one in that two instead of three drives are required to produce global or orbital scans.

It should also be clear that this third embodiment will yield the desired same end result as the first embodiment. The first is preferred, however, in that it utilizes two identical driven elements affording the advantage of commonality of parts. This third embodiment requires two different drive mechanisms.

Figure 6:
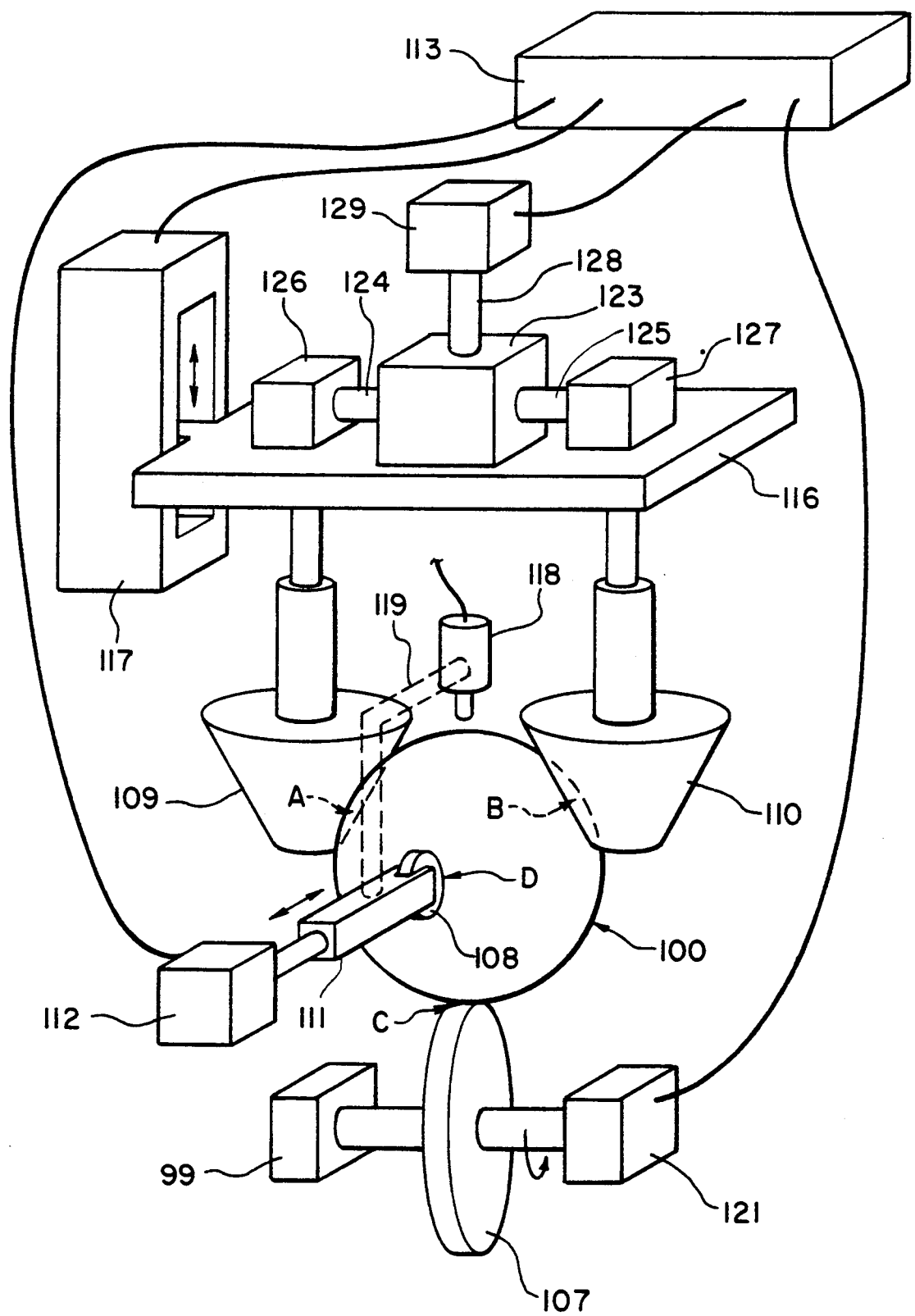
FIG. 6 is an isometric view along the format of FIG. 2 of a further embodiment of the invention.

A fourth embodiment of the invention is shown in FIG. 6. In function, this embodiment is equivalent to the second embodiment shown in FIG. 4. In this embodiment the two speed-controlled drives 114 and 115 for the conical elements 109 and 110 in FIG. 4 are replaced with a mechanical differential drive assembly 123 the output shafts 124 and 125 of which drive the conical elements 109 and 110 through mechanical linkages 126 and 127. The input shaft 128 of the differential drive assembly is driven in an on-off cyclic manner by speed-controlled motor assembly 129. The differential drive assembly 123 is similar in principle to that used in automotive rear-wheel drives in which the two output shafts will turn at differential speeds, one greater and one less than, the put shaft speed.

In this embodiment, the differential drive assembly 123 is configured such that with no torque applied to the input shaft 128 and the output shafts 123 and 124 driven at identical speeds, the output shaft speed will be zero. When the input shaft 128 is driven at a fixed speed above zero, one output shaft speed will increase and the other will decrease by identical factors above and below the original speed.

In operation, the input shaft 128 of the differential drive 123 is alternately driven on and off. During its off time, the two conical elements 109 and 110 rotate at equal speeds in opposite directions by influence of the sphere being rotated by the cylindrical element 107 in the same manner as in the second embodiment of FIG. 4. When the input shaft is driven at a positive speed, differential speeds are applied to the axis of rotation exactly as described for the second embodiment.

An advantage of this fourth embodiment over the second embodiment (FIG. 4) is that only two speed-controlled motors are required rather than three. A disadvantage of this embodiment with respect to the second embodiment is that two instead of three degrees of freedom are available for producing various scan patterns over the spherical surface.

In the third embodiment described by FIG. 5, the free-wheeling conical element 110 serves only to provide support at contact point B and has no effect on the motion control. As stated in the Detailed Description Of The Invention, it is not necessary that contact points A and B be in the same plane or on a line parallel to the X axis.

Figure 7:
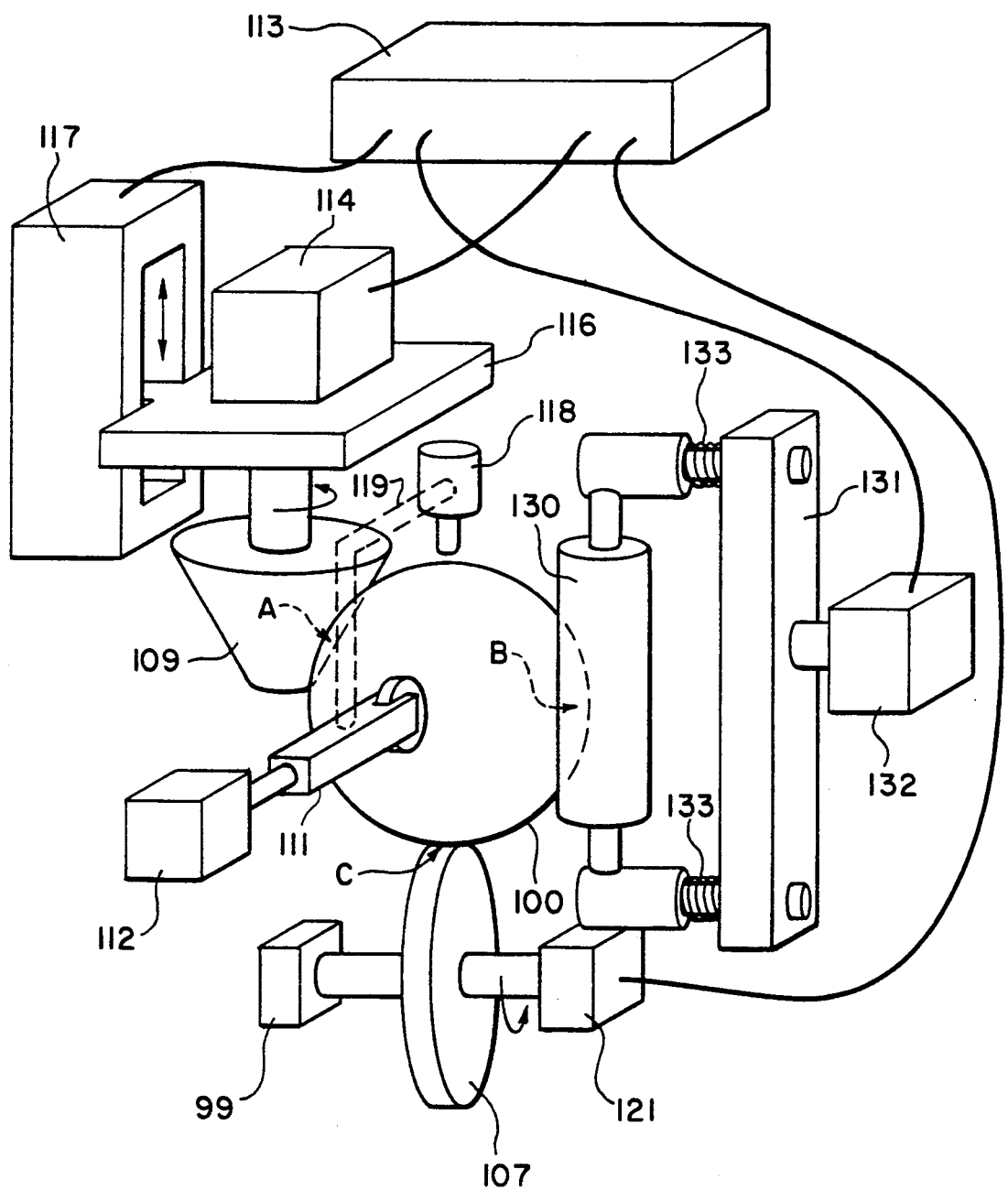
FIG. 7 is an isometric view along the format of FIG. 2 of another embodiment of the invention.

A fifth embodiment of this invention in which the contact points A and B are not fixed with respect to each other at equal latitudes on the sphere 100 is illustrated in FIG. 7. In this embodiment the conical element 110 and its drive 115 are replaced by free-wheeling cylindrical contacting element 130 which is positioned with its axis parallel to the Y axis by the support assembly 131. In order to accommodate a wide range of diameters for sphere 100, the axis of the cylinder is positioned along the X axis with a position control assembly 132 acting on the support assembly 131. The cylinder 130 is spring-loaded to the support assembly 131 through springs 133. This precludes the need for high-precision position or control of the cylinder axis along the X axis. The diameter of the cylinder 130 can be anything larger than the minimum required for stiffness or strength in any given application.

As the cylinder 130 is free-wheeling, it will be driven by the sphere 100 at a speed to satisfy its contact diameter on the surface of the sphere exactly as the case for the third embodiment. An advantage of this embodiment over the third embodiment is that only one precision conical element is required and the cylinder is simpler to manufacture in comparison with the cone.

Figure 8:
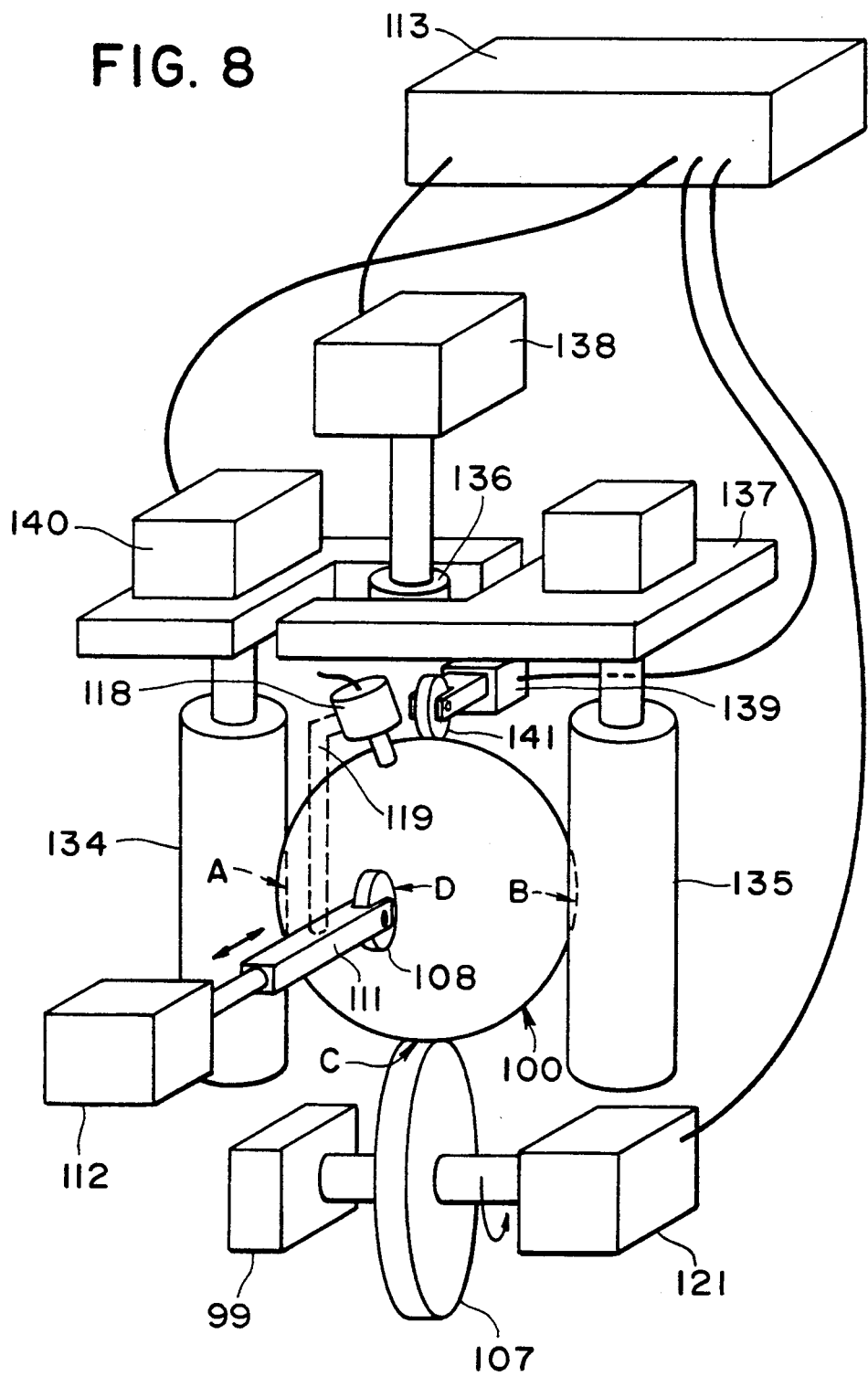
FIG. 8 is an isometric view along the format of FIG. 2 of still another embodiment of the invention.

In a sixth embodiment shown in FIG. 8, both of the conical elements 109 and 110 are replaced by cylinders 134 and 135 the axis of which are on a line parallel to the X-Y plane. The spacing between the two axis of the cylinders is adjustable through a bi-directional gear mechanism 136 which is a part of the overall support assembly 137. The cylinders are mounted to the support assembly 137. The bi-directional gear mechanism 136 is driven by the position control assembly 138 with position controlled by the computer 113.

In this embodiment there is no conical element which would exert downward force on the sphere 110 against the element 107. Here a fifth contacting element 141 which is either a free-wheeling cylindrical disk or cup bearing contact the sphere 100 similar to that used for the contact element 108 at contact point B in any of the other embodiments. This hold-down element 141 contacts the surface on the sphere 100 at a point in the Y-Z plane displaced slightly in the −Z direction such as to exert a force on the sphere 100 against both the elements 107 and 108 at contact points C and D respectively. The tension on 141 is large enough to hold the sphere against those two contact elements 107 and 108 and its position controlled in the vertical direction through the motion control mechanism 139.

One cylinder, 135, is free-wheeling. The other, 134, is driven by speed-controlled motor assembly 140. Either cylinder can be driven or free-wheeling. All other components and their functions are the same as those specified in the other embodiments of this invention.

In this arrangement the cylinders 134 and 135 contact the sphere 100, of any diameter, on a major diameter on the X axis. As such, when the sphere 100 is rotated about the X axis by contacting element 107, the relative velocity of the sphere surface to the cylinder surface at contact points A and B is zero. Consequently, rotating any one of the cylinders 134 or 135 about its axis will cause the sphere to rotate about the Y axis independently of the rotation about the X axis caused by the driven cylindrical element 107. That is to sa that the sphere 100 is being rotated simultaneously about both the X and Y axis.

Over any given time interval, with the cylindrical elements 107 and 134 being driven at constant and either equal or unequal speeds, the angular rotation of sphere 100 about the Y axis will be proportional to the diameter of the cylindrical element 134 and the speed at which it is driven and the angular rotation about the X axis proportional to the diameter of cylindrical element 107 and the speed at which it is driven. By appropriate selection of diameters for the two conical elements 107 and 134 and fixed different speeds for each, a scan pattern over the surface of the sphere 100 will result with the separation of adjacent scan lines proportional to both the ratio of the diameters of the two cylindrical elements 134 and 135 and the ratio of the speeds of the two. Although the scan pattern will not be perfectly global with two distinctly defined poles, it will be nearly global when the diameter and speed of the cylindrical element 134 are both much smaller than those for the cylindrical element 107.

A perfectly global scan pattern is achievable with this embodiment by driving the two cylindrical elements 107 and 134 in a cyclical on/off manner. For that result, the element is driven for one full revolution at any fixed speed with the element 134 free-wheeling. At the end of that first revolution about the X axis, element 107 is momentarily stopped and during that moment 134 rotated a small amount to cause the sphere 100 to rotate about the Y axis corresponding to the desired separation angle between adjacent meridians and then it is stopped and 107 started and the process continued for the number of revolutions of 107 to complete the entire global scan.

Figure 9:
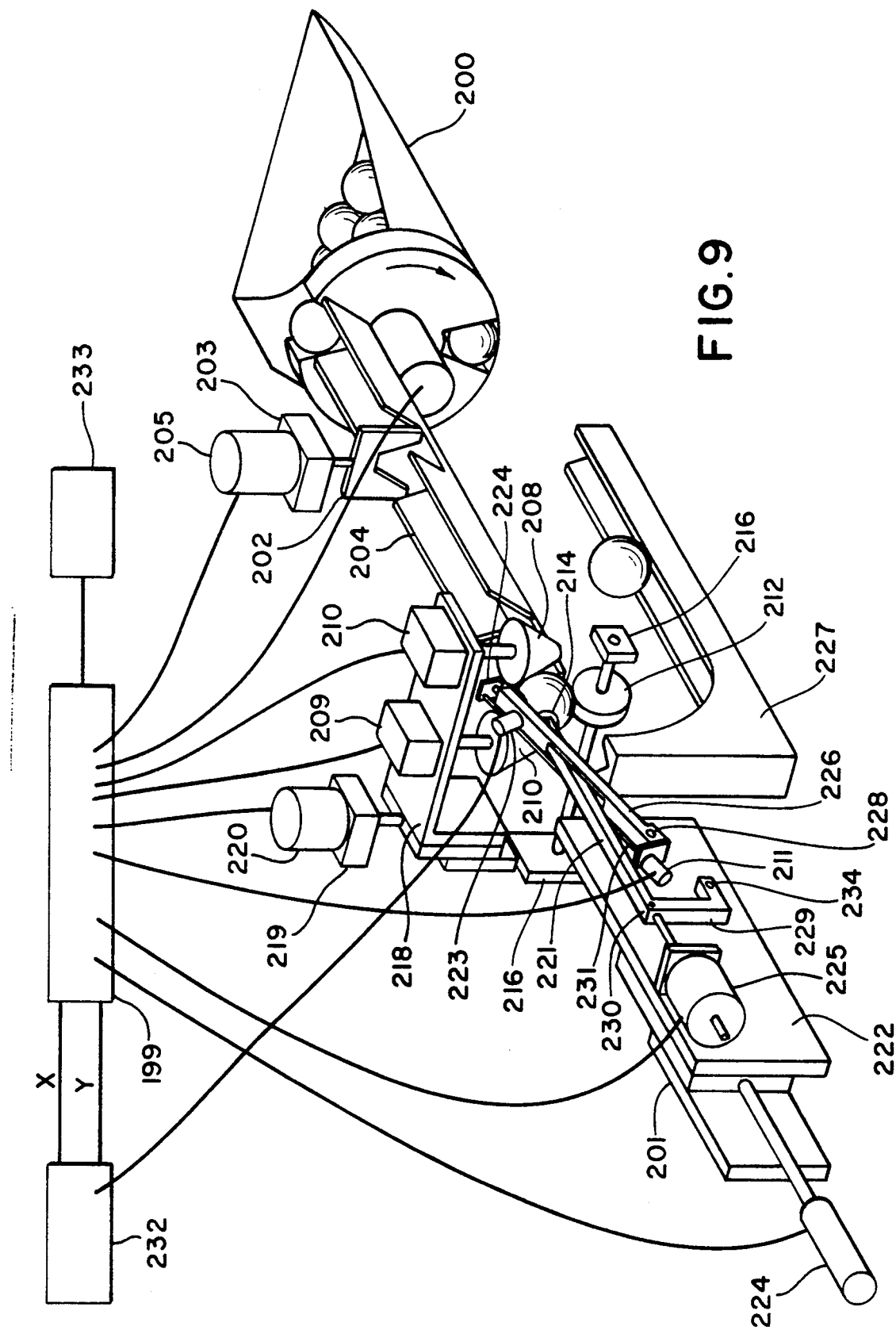
FIG. 9 is a diagrammatic elevational section of an inspection machine for testing spherical objects.

FIG. 9 is a diagrammatic elevational sectional view through an apparatus for carrying out the present invention for the continuous sequential inspection of bearing balls. The ball to be inspected are delivered to the apparatus by means of an external chute or manually batch loaded into a hopper 200. The discharge side of the hopper 200 has a position controlled gate 202 whose position is adjusted by means of the computer/controller 199 such that only balls of diameter for which the apparatus has been programmed will pass from the hopper 200 through the gate 202. The gate 202 is sequentially opened and closed by means of a suitable gear 203 and motor 205 with the open position such that only the balls of predetermined programmed size will pass through. The position of the gate 202 and its actuation are controlled by computer/controller 199 such as to allow one ball at a time to be sequentially passed through for inspection at the end of the test cycle for the previously inspected ball.

Behind gate 202 is a chute 204 which directs the ball passed through the gate 202 into the scanning apparatus 206 shown in block by dashed lines. This apparatus can be any one of the six embodiments described above. For this description the first embodiment is shown utilizing two conical contacting elements 208 and 210 and two cylindrical disk contacting elements 212 and 214. The element 212 is fixed in position and supported in two bearings 216 such as to be free-wheeling.

The two conical elements are driven by two motors 209 and 210 both of which are speed controlled by computer/controller 199 and both of which an be any suitable form known in the art. The conical elements and motors are rigidly mounted to a support assembly 218 which is moveable in the vertical direction by any suitable conventional positioning mechanisms comprising a motor 220 and gear assembly 219. The position of the assembly is controlled by the computer/controller 199.

The cylindrical disk contacting element 214 is part of and mounted on an arm assembly 221 which is connected to a position and motion control assembly 222. Also mounted on the arm 221 is an eddy-current probe 223 and calibration standard plate 224. Further details of this entire assembly are shown schematically in elevation in FIG. 10 and its function described later. The assembly 222 is mounted on a fixed track or slide assembly 201 and may be moved in and out along the assembly between two points by an actuator 231 which can be any suitable solenoid, motor, or other actuator known in the art. The actuator 231 is controlled by the computer/controller 199. The position of the arm 221 is controlled by a position control motor 225 which is controlled by the computer/controller 199. The calibration standard plate 224 can be moved back and forth such as to pass under the eddy-current probe 223 by a solenoid 211 which may be similar in function to 224 and which is actuated by the computer/controller 199. when the assembly 222 is drawn away from the fixed element 212 by actuation of 224, any ball which was in the inspection position between the conical elements 208 and 210 will fall by gravity into a discharge chute 234.

Figure 10:
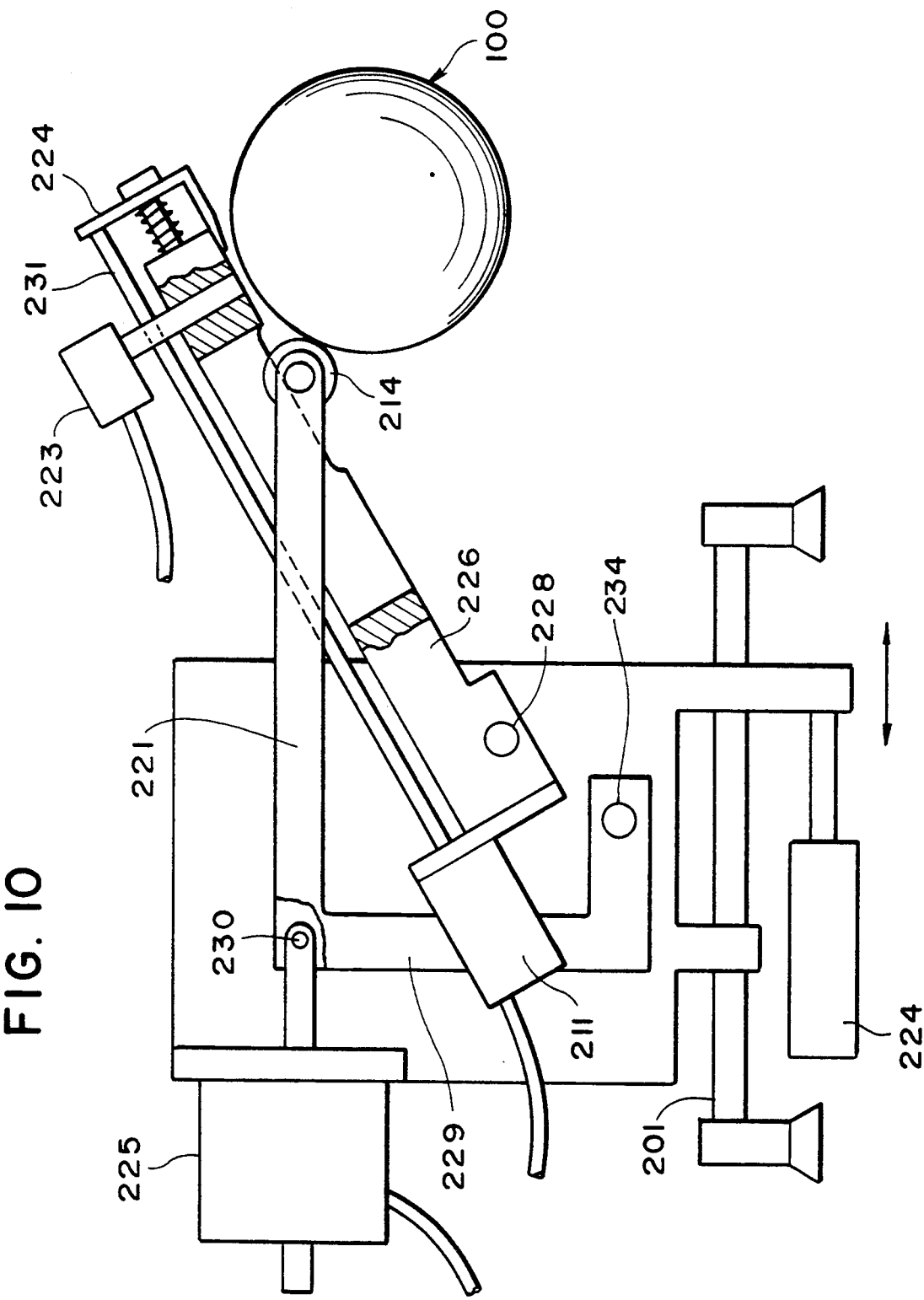
FIG. 10 is a schematic elevation of a probe/standard carriage assembly.

Referring to FIG. 10, the spatial relationship of the cylindrical contact element 214, eddy-current probe 223 and calibration standard plate 224 with respect to the arm assembly 221 are shown. The main arm 221 and link 226 have fixed pivot points 227 and 228 on a plate 229. Action of the position control motor 225 pivots plate 229 at pivot point 270 causing cylindrical element 214 to move along an arc to any position such as to contact the ball of a given diameter. The eddy-current probe 223 is in fixed position on the arm such that it will always be in sufficiently close proximity to the ball surface for flaw detection. The calibration standard 224 is a metal plate of the same material or alloy as the ball being inspected.

A small artificial defect is machined on the surface of the plate which faces the eddy-current probe 223. The standard 224 is connected by a moving arm 231 connected to actuator 226 actuation of which causes the artificial defect on the standard 224 to pass directly under the probe 223.

The eddy-current probe 223 is electrically connected to a conventional eddy-current instrument or electronics set 232 which can be included within the same cabinet with all of the apparatus. The normal X (in-phase) and Y (quadrature) signal components out from the eddy-current electronics are fed to the computer/controller 199 for monitoring flaw detection and controlling the system operation as describe later. A control panel 233 provides for execution of all data input to the computer/controller 199 via a keyboard mounted thereon and control of the apparatus for either automatic continuous sequential inspection of balls or manual operations to feed and manipulate balls, one ball at-a-time for slow-motion detailed inspection.

Operation of the inspection in the automatic mode is as follows:

(1) Test data such as ball size, spacing of the meridians of the scan pattern, number of balls in a batch, date/time, etc. are entered into the computer/controller 199 via keyboard on the control panel 233. Upon completion of data entry, the elements 208, 210 and 214 are driven to their corresponding positions for the specified ball size. At that time the elements 208 and 210 are positioned 0.020" to 0.060" (for ball diameters ranging 0.25" to 2.00") above the final ball contact position.

(2) Either a batch of balls (one or more) are loaded into the hopper 200 or an external ball feed system is connected to feed the hopper 200 continuously.

(3) Upon actuation of an automatic test start switch on the panel 233 the calibration standard 224 is moved back and forth past the probe within a fraction of a second during which the Y component signal level from the eddy-current set 232 is monitored by the computer/controller 199. If the signal level equals or exceeds that for which the standard 224 was previously, the process will continue to step 4 below. If that signal level is too low, the process stops and an error message is displayed on the panel 233, indicating the need to re-calibrate the eddy-current instrument.

(4) Upon completion of a valid calibration test, the gate 202 opens to its programmed position for the ball size programmed and allows one ball to roll down the chute 204 by gravity and come to rest on the elements 212 and 214 in between the two conical elements 208 and 210.

(5) For a pre-determined time interval of a few seconds from opening gate 202 to starting the ball scanning process, the X signal component output of the eddy-current set 232 is monitored for the change in its corresponding to a ball appearing in front of the eddy-current probe 223. If that signal appears the process continues to step 6. If it does not appear and persist within and to the end of the pre-determined time interval, the process stops and an error message is displayed on the panel 233.

(6) When a ball is sensed to be in position (by the X component of the eddy-current signal) the drive motors 209 and 210 are started and drive each conical element 208 and 210 and equal speeds in opposite directions and the supported assembly 208 is driven downward by means of positioning motor 220 through gear assembly 219 so that the conical elements 208 and 210 contact the ball and start it rotating about the X axis.

(7) Following one or more revolutions of the ball the cyclic speed variations commence as described in connection with FIG. 3 and continued for the time interval required to completely scan the ball with the programmed meridian spacing, $\delta$.

(8) During the scanning interval, the Y signal component of the eddy-current set is monitored and compared with a threshold setting established for the signal level to which the standard 224 was calibrated. If during the scan, the Y signal component exceeds that level, an alarm signal will be generated in the controller of 199 and latched until the end of the test cycle.

(9) At the end of the scanning time interval, the assembly 222 moved away from the ball by actuator 224 and held back for the brief time interval for the ball to fall by gravity into the discharge chute 227. If an alarm signal was generated (step 8) during the scanning interval, a visual or audible alarm indication will be displayed on the control panel 233. That alarm signal is also available as an output from the computer/controller 199 which can be used to further direct the balls on the output from discharge chute 227.

(10) At the end of the test cycle for the first ball the gate 202 opens to pass the second ball as in step (4) above. The calibration test, step (3), is not repeated. The second and all subsequent balls go through the same test sequence steps (4) through (6) until the total number of balls in the batch originally programmed are inspected. After the last ball is tested, the eddy-current calibration is again checked exactly as done in step (3).

(11) If the eddy-current calibration is verified at this time a valid test-complete message is indicated or displayed on control panel 233. If the calibration is not verified, an invalid test-complete signal is displayed.

(12) The computer/controller 199 then resets the system leaving it ready to start another test on the same ball size or on a new size programmed is programmed via the control panel 233.

Operation in the manual mode is as follows:

(1) The same as for the automatic mode.

(2) One or more balls are manually placed in the hopper 200.

(3) Upon actuation of a manual test start switch, one ball is fed via gate 202 to the scanning mechanism and the ball scanning commences in the exact manner as steps (4) through (7) in the automatic mode either a stop switch is actuated on the panel 233 or a flaw is detected and an alarm signal generated at which time the scan stops but the ball is held in position between the four contact elements.

(4) With the scan stopped and the ball in position, the scan may be restarted at much lower speed in order to allow careful monitoring of the X and Y eddy-current signals by suitable oscilloscope means. When a flaw signal is observed at this slow speed, actuating a scan stop button will almost instantaneously stop the scan such that the flaw will be in very close proximity to the probe 223. This facilitates locating the flawed area on the ball. In that stopped condition, the ball may be slowly manipulated back and forth on one meridian such as to cause the flaw to move back and forth under the probe thereby facilitating detailed examination of the magnitude and character of the eddy-current X and Y signals associated with the flaw.

5. Upon completion of manual testing a test stop switch on panel 133 which resets the system for subsequent use in either the manual or automatic mode.

The inspection system incorporating other embodiments of this invention as described above is useful for other than eddy-current inspection. For example, the system could be an optical inspection system for inspecting the surface quality of a sphere. For that purpose the probe 223 would be replaced by an appropriate light source focused on the ball surface such as to reflect light off the surface onto a detecting element appropriately placed as described in connection with FIG. 1 and the eddy-current set 232 with an electronic set to process the reflected sight signal received by the detector. All other functions of the machine would be the same as described above for the eddy-current inspection system.

What is claimed is:

1. An apparatus for rotating a spherical object comprising:

(a) suspension means for supporting a spherical object in a fixed position relative to its center, said suspension means holding the sphere in position by simultaneously contacting its surface with contacting elements at a minimum of four points on its surface, each of the points being spatially independent of each other;

(b) each of the contact elements being of regular shapes having symmetry about an axis of rotation and each of said elements either free to rotate or be driven in rotation about its axis, (c) at least one of the contact elements being rotationally driven by a rotating means, and (d) the rotating drive means being rotated at a fixed or time-varying speed to impart controlled movement to the sphere bout an axis through its center, said speed or temporal characteristics of said time-varying speed causing the resultant controlled rotational motion of the sphere by manipulating an axis of rotation through its center.

2. The apparatus as claimed in claim 1 wherein the contact elements are cones, spheres, cylinders, or combinations thereof.

3. The apparatus as claimed in claim 1 wherein each of the contact elements are independently driven at fixed or time-varying speeds to effect the desired surface motion.

4. The apparatus as claimed in claim 1 wherein two of the four contacting elements are free-wheeling cylindrical disks, one fixed in space with respect to the apparatus, the other positionable under computer control to contact the surface of the suspended sphere and wherein the other two are conical in shape, fixed in position with respect to each other on a common support structure, the position of which is controlled by a position control system and wherein each conical contact element is independently driven in rotation under programmable time-varying speeds under computer control.

5. The apparatus as claimed in claim 1 wherein two of the four contacting elements are cylindrical disks, one fixed in space with respect to the apparatus, the other positionable under computer control to contact the surface of the suspended sphere and wherein one of those elements is free-wheeling, the other driven in rotation at programmable time-varying speeds under computer control and wherein the other two contacting elements are conical in shape, fixed in position with respect to each other on a common support structure, the position of which is controlled by a position control system and wherein each of the conical contact elements are independently driven in rotation at programmable speeds in a cyclical on/off manner with the on and off times variable under computer control.

6. The apparatus as claimed in claim 1 wherein two of the four contacting elements are cylindrical disks, one fixed in space with respect to the apparatus, the other positionable under computer control to contact the surface of the suspended sphere and wherein one of those two contacting elements is free-wheeling, the other is driven in rotation at programmable time-varying speed under computer control and wherein the other two contacting elements are conical in shape, fixed in position with respect to each other on a common support structure, the position of which is controlled by a position control system and wherein one conical contacting element is free-wheeling, the other driven in rotation at programmable time-varying speeds under computer control.

7. The apparatus as claimed in claim 1 wherein two of the four contacting elements are cylindrical disks, one fixed in space with respect to the apparatus, the other positionable under computer control to contact the surface of the suspended sphere and wherein one of those elements is free-wheeling, the other driven in rotation at programmable time-varying speeds under computer control and wherein the other two contacting elements are conical in shape, fixed in position with respect to each other on a common support structure, the position of which is controlled by a position control system and wherein both of the conical contacting elements are reactionally driven on the output shafts of a mechanical differential drive, the input shaft of which is driven in rotation at programmable time-varying speeds under computer control.

8. The apparatus as claimed in claim 1 wherein two of the four contacting elements are cylindrical disks, one fixed in space with respect to the apparatus, the other positionable under computer control to contact the surface of the suspended sphere and wherein one of those two elements is free-wheeling, the other driven in rotation at programmable time-varying speeds under computer control and wherein a third contacting element is a free-wheeling cylinder positionable under computer control to contact the surface at the sphere and further wherein a fourth contacting element is conical in shape, positionable under computer control to contact the surface of the suspended sphere and driven in rotation at programmable time-varying speeds under computer control.

9. The apparatus as claimed in claim 1 wherein two of the four contacting elements are cylindrical disks, one fixed in space with respect to the apparatus, the other positionable under computer control to contact the surface of the suspended sphere and wherein one of those two elements is free-wheeling and the other driven in rotation at programmable time-varying speeds under computer control and wherein the other two contacting elements are cylinders positioned with their axes parallel to each other and both cylinders either dependently of independently positioned apart from each other by a position control system with each cylinder contacting the surface of the suspended sphere at two points on a common diameter of the sphere and wherein one of the cylinders is free-wheeling, the other driven in rotation at either fixed or time-varying speeds under computer control.

10. An apparatus for conducting eddy-current inspection of bearing balls comprising:

(a) ball suspension and scanning assembly for supporting a ball in a fixed position relative to its center said assembly holding the ball in position by simultaneously contacting its surface with contacting elements at a minimum of four points on its surface, each of the points being spatially independent of each other and each of said contacting elements being of regular shapes having symmetry about an axis of rotation, (b) rotating drive means to rotate at least one of said contacting elements at a fixed or time-varying speed to impart controlled movement to the ball about an axis through its center, (c) an eddy-current probe positioned above and in close proximity to the surface of the ball being tested for detection of flaws on or below the ball surface, (d) a multi-axis computer control system for positioning the contacting elements suspending the ball, controlling the fixed or time varying speeds of the driven contacting elements, and controlling the operation of all the functional elements of the apparatus, (e) means for sequentially feeding balls from a hopper through a controlled gate opening to the ball suspension and scanning assembly, (f) means for monitoring the eddy-current in-phase and quadrature signals for the multiple purposes of (1) detecting a flaw or defect on or below the ball surface, (2) detecting the presence of a ball in proper position in the suspension apparatus with its surface sufficiently close to the eddy-current probe and (3) providing an alarm output signal upon flaw detection for display and/or control of the ball discharge path, (g) means for manually feeding a ball into the suspension means and performing either high- or low-speed scanning of the ball surface with low-speed scanning in either forward or reverse scan directions, (g) a control panel on which is mounted control switches, data entry keyboard and display lamps, and data display and recording means.

11. The apparatus claimed in claim 10 wherein included is an electromechanical positioning device for simultaneously positioning one ball contacting element and the eddy-current probe and operating a calibration standard mechanism, comprising:

(a) two arms linked to each other on a common support structure at two different pivot points on that structure such that when one arm moves in an arc about its pivot point, the other moves in a predetermined different arc, (b) means to control the angular motion of one arm about its pivot point using a linear motion control motor, (c) a free-wheeling cylindrical contacting element on the end of one arm which element contacts the ball surface when the ball is suspended in the scanning mechanism and an eddy-current probe in the other arm such that as the cylindrical contacting element is moved for various ball diameters the eddy-current probe will move also and stay in close proximity to the ball surface for eddy-current inspection.

(d) means to cause a calibration standard to move back and forth in front of the eddy-current probe without interfering with the contacting element or other operation of the system.

* * * * *